Feb. 6, 1973  J. BOTERWEG  3,714,929
WATERING APPARATUS FOR POULTRY
Filed Dec. 7, 1970
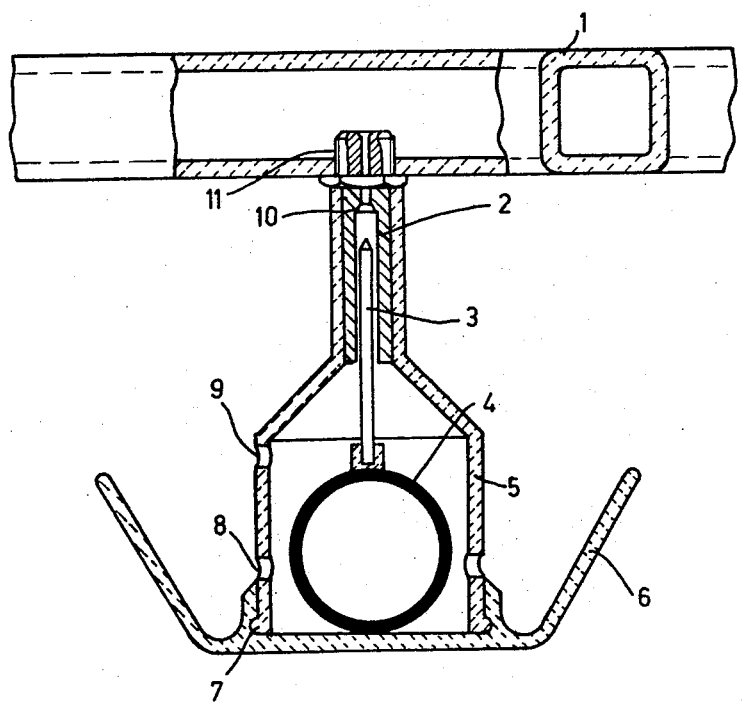
INVENTOR
JELLE BOTERWEG
BY Kurt Kelman
AGENT United States Patent Office 3,714,929
Patented Feb. 6, 1973

3,714,929
WATERING APPARATUS FOR POULTRY
Jelle Boterweg, Steninstraat 20, Kampen, Netherlands
Filed Dec. 7, 1970, Ser. No. 95,864
Int. Cl. A01k 7/02
U.S. Cl. 119—80
7 Claims

ABSTRACT OF THE DISCLOSURE

Drinking apparatus for poultry comprising a water conduit, a valve at the bottom of the conduit, and a central support for a drinking bowl detachably fastened to the valve casing below the valve.

---

This is a surprising improvement which relates to a prefabricated watering apparatus for poultry, provided with a water tube, water channel or the like, having at least one valve on the bottom-side of the apparatus.

In watering (or drinking) apparatus of this type which are particularly used in poultry pens having a battery-structure (or structure in rows), the valves each time deliver small quantities of water when the bird's bill is picking upon the sealing members, which are constructed as nipples, the quantities of water being usually drunk only partially by the animals. A considerable part of the quantity of water is wasted by dropping away or spraying away, moistening the surroundings, particularly surfaces on which mud is present.

The moistening of the surroundings of the valves with said sprayed or dropped water, particularly the moistening of mud or the like is undesirable on hygienic grounds, as well as on account of the hygrometric condition in the poultry pen, etc.

The improvement in question provides an apparatus preventing the foregoing disadvantage. Starting from a watering or drinking apparatus of the abovementioned type, the improvement is characterized by a drinking bowl detachably fastened to the valve-casing below the valve by means of a central supporting body. With simple means and actively this construction excludes an undesired moistening of the valve-surroundings with any remaining water. The drinking bowl can be easily mounted upon the valve-casing of a valve and removed therefrom, for instance for cleaning purposes. Water collected in the drinking bowl can be directly taken by the animals, independently upon valve-operation.

In a further development (or embodiment) of the watering apparatus according to this improvement the central supporting body forms a casing to include a float bearing a valve needle which forms the sealing body of the valve and which is moving up- and downwardly together with the float. This embodiment guarantees the presence of a certain water supply in the drinking bowl irrespective of the fact whether the valve is put into operation by the animals or not, which water supply is increased automatically in conformity with the quantity of water drunk by the animals.

The supporting body forming the float casing, substantially has the shape of a cylinder being open on the bottom-side in the area of movement of the float and being sealed by the drinking bowl, the cylinder wall having openings for the passage of water at a predetermined distance from the bottom surface and above same there is at least one ventilating opening. In this embodiment the float per se is withdrawn from an entrance by the animals, the water supply being only controlled in the drinking bowl dependent upon the adjusting water lever, so that it is actively prevented that the drinking bowl overflows, as a consequence of picking on the float, done on playing impulses which are natural for animals. The supporting body being simply and easily manufactured from a synthetic molded plastic at the same time, the expenses thereof are low, which is a great advantage.

The wall of the supporting body can further be provided at its outer side with a revolving supporting collar mounted in the reach of the bottom end and the drinking bowl can be provided with a cylindrical connecting flange upwardly protruding from the bottom-plane of the bowl and surrounding the supporting body outwardly, which connecting flange bears on its innerside a radial groove cooperating with the supporting collar and the parts.

This embodiment provides a fixed, however, always detachable connection between the supporting body and the drinking bowl, so that this bowl can easily be removed for cleaning purposes. The drinking bowl also forms a part to be easily constructed and easily manufactured of molded plastic.

Preferably the outer walls of the bowl 6 are outwardly inclined from the bottom upwards and constitute in cross-section an upwardly open V together with the central connecting flange of the bowl. A drinking sink or bowl is created therewith, preventing undue pollution by rests of forage. The bottom of this sink is lying below the openings for the passage of water, so that rests of forage or any other pollutions are kept away far from the inside of the supporting body, including the float.

An example of the embodiment of the apparatus according to the present invention is reproduced in the drawing.

A water-tube, for example made of plastic, having an appropriate rectangular or quadrangular cross-section supports a housing or casing of a valve on its bottom-side.

The bottom-side of the water tube 1, being only reproduced in schematical fragment has a plurality of valves spaced over the length of the water-tube. In the reproduced example the valve-casing 2 is screwed in the water-tube 1 with a threaded connection member 11. The valve casing comprises an axial channel for water passage, which comprises a shoulder 10 forming the seat for a valve needle 3.

The valve needle 3 forming the sealing body of the valve is supported by a spherical float 4—represented in the embodiment-example—and is vertically movable up- and downwardly with said float.

A central supporting body 5 made as float casing is clampingly or screwingly arranged on the valve casing 2.

The central supporting body 5, including the float 4, is shaped as a cylinder being open on the bottom-side in the area of movement of the float 4, surrounding the float 4 upon a distance. Adjacent to the bottom-plane outside the wall of the supporting body 5 a revolving supporting collar 7 is mounted in the reproduced example, on the position of which some peripheral spaced supporting shoulders can also be arranged.

The V-like outer walls of the bowl 6 are outwardly inclined and the bowl comprises a central region of bottom which is sealing the supporting body 5 on its bottom-side. For the mounting of the bowl 6 to the supporting body 5 this bowl comprises a cylindrical connecting flange protruding upwardly from the bottom surface of the bowl, which flange is surrounding the supporting body outwardly, on the lining of said connecting flange a radial groove is cooperating with the supporting collar in a combined structure of parts. A drinking sink widening upwardly—in cross-section—V-like is formed by the outer or side walls of the bowl 6 together with the central connecting flange, resp. the cylindrical side of the supporting body 5.

In the walls of the supporting body 5 spaced above the bottom-plane thereof openings 8 for passage of water are arranged, which are arranged directly above the top-edge of the connecting flange as represented in the example. A ventilating opening 9 is arranged in the wall of the supporting body 5 spaced above the openings 8 for the passage of water.

The drinking apparatus being quick and simply combined and fixed on the valve casing 2 in practical circumstances from the separate parts, water is flowing that long from the water tube 1 until the float 4 is lifted by the adjusting water-level in the supporting body 5 and via the openings 8 for passage of water in the bowl (or cup) 6. When the predetermined water-level is reached, the valve needle 3 is supported by the valve seat 10 and blocks the water supply. If the water-level is dropping because the animals are drinking water, the float 4 is following and the flow of water in the valve is released, until the predetermined level of the water is reached again.

I claim:
1. An automatic water dispensing device for poultry comprising, in combination: a valve housing having a flow passageway defining an inlet and outlet and a valve seat formed therebetween, said housing having means to connect to a water conduit means; a chamber connected to the outlet of said flow passageway and said housing means for receiving water from said conduit means through said passageway; valve means movable in said passageway and housing means responsive to water level controlled means, means in said chamber, said valve means cooperable with said seat to block flow through said passageway after a predetermined level of water is reached in said chamber and movable away from said seat to permit flow through said passageway when the level of water in said chamber is less than said predetermined level; and bowl means anchored to and communicating with said chamber for dispensing water to the poultry, said valve housing, chamber and bowl means forming a rigid device connected to said water conduit means.

2. The automatic poultry watering system according to claim 1 wherein said valve means includes a valve needle in said passageway, one portion of said needle being positionable on said seat to block flow through said passageway, said means in said chamber comprising a float connected to another portion of said needle such that when said float is raised to a preselected water level, said one portion of said needle seats on said seat to prevent further flow through said passageway.

3. The automatic poultry watering system according to claim 2 wherein said chamber has substantially the shape of a cylinder, one end of said chamber being connected to said valve housing, the opposite end being closed by said bowl means which surrounds said chamber, said float being isolated within said chamber from said bowl means to prevent contact with said float by the poultry drinking from said bowl means.

4. The automatic poultry watering system according to claim 4 wherein the outside wall of said chamber comwater conduit means, said chamber is suspended from said housing and said bowl means is suspended from and around said chamber, said wall of said chamber including means defining openings therethrough communicating with said chamber and at least one ventilating opening above said communicating openings.

5. The automatic poultry watering system according to claim 4 wherein the outside wall of said chamber comprises a supporting collar in the region of its lower end, said bowl means having a cylindrical connecting flange protruding upwardly from the lower floor of the bowl means and surrounding the supporting collar of said chamber, which connecting flange bears on its inner side a radial groove cooperating with the supporting collar.

6. An automatic water dispensing device for poultry comprising: a tubular valve casing affixed at one end to a water supply and having a flow passageway communicating with the water supply at its inlet; a chamber secured to said casing at the other end for receiving water from said supply, said casing and passageway including a valve seat and having a needle valve movable therein between a first position wherein said needle valve is seated on said seat to block the flow of water to said chamber and a second position wherein said needle valve is spaced from said seat to allow the flow of water to said chamber, said needle valve in either of said first or second positions extending partially into said chamber; a float fixed to said portion of said needle valve extending into said chamber and operable to move said needle valve between said first and second positions in response to the level of water in said chamber; and a drinking bowl detachably secured to the chamber, said float and needle valve being shielded within said chamber and said casing from contact by the poultry drinking from said drinking bowl.

7. The automatic water dispensing device according to claim 6 wherein the length of said passageway acts as a guide for said needle valve to facilitate positive seating of said needle valve in said valve casing.

References Cited

UNITED STATES PATENTS

| | | | |
|---|---|---|---|
| 2,821,167 | 1/1958 | Gilbertson | 119—81 |
| 2,618,237 | 11/1952 | McDermott et al. | 119—18 |
| 893,208 | 7/1908 | Van Dyne | 119—80 X |
| 1,928,103 | 9/1933 | Hill | 119—78 |
| 3,079,892 | 3/1963 | Lowery | 119—79 |
| 3,428,028 | 2/1969 | Hart | 119—75 |
| 3,610,206 | 10/1971 | Davis | 119—78 |
| 3,157,160 | 11/1964 | Osier | 119—79 |

ALDRICH F. MEDBERY, Primary Examiner

U.S. Cl. X.R.

119—74